(12) United States Patent
Wung et al.

(10) Patent No.: US 10,546,593 B2
(45) Date of Patent: Jan. 28, 2020

(54) DEEP LEARNING DRIVEN MULTI-CHANNEL FILTERING FOR SPEECH ENHANCEMENT

(71) Applicant: Apple Inc., Cupertino, CA (US)

(72) Inventors: Jason Wung, Los Angeles, CA (US); Mehrez Souden, Los Angeles, CA (US); Ramin Pishehvar, Los Angeles, CA (US); Joshua D. Atkins, Los Angeles, CA (US)

(73) Assignee: APPLE INC., Cupertino, CA (US)

( * ) Notice: Subject to any disclaimer, the term of this patent is extended or adjusted under 35 U.S.C. 154(b) by 133 days.

(21) Appl. No.: 15/830,955

(22) Filed: Dec. 4, 2017

(65) Prior Publication Data

US 2019/0172476 A1 Jun. 6, 2019

(51) Int. Cl.
*G10L 21/00* (2013.01)
*G10L 19/00* (2013.01)
*G10L 21/02* (2013.01)
*G10L 15/02* (2006.01)
*G10L 21/0232* (2013.01)
*G10L 25/30* (2013.01)
*H04R 1/40* (2006.01)
*G10L 25/03* (2013.01)
*G10L 21/0208* (2013.01)

(52) U.S. Cl.
CPC ......... *G10L 21/0205* (2013.01); *G10L 15/02* (2013.01); *G10L 21/0232* (2013.01); *G10L 25/03* (2013.01); *G10L 25/30* (2013.01); *G10L 2021/02082* (2013.01); *H04R 1/406* (2013.01)

(58) Field of Classification Search
CPC ......... G10L 15/00; G10L 25/78; G10L 15/16; G10L 15/30; G10L 15/02; G10L 15/22; G10L 15/08
See application file for complete search history.

(56) References Cited

U.S. PATENT DOCUMENTS 8,775,341 B1 * 7/2014 Commons ............ G06N 3/0454
706/20
9,813,810 B1 * 11/2017 Nongpiur ............... H04R 3/005
(Continued)

OTHER PUBLICATIONS

Chinaev, Aleksej, et al., "Noise-Presence-Probability-Based Noise PSD Estimation by Using DNNs", ITG-Fachbericht 267: Speech Communication, Oct. 7, 2016, 26-30.

(Continued)

*Primary Examiner* — Shreyans A Patel
(74) *Attorney, Agent, or Firm* — Womble Bond Dickinson (US) LLP

(57) ABSTRACT

A number of features are extracted from a current frame of a multi-channel speech pickup and from side information that is a linear echo estimate, a diffuse signal component, or a noise estimate of the multi-channel speech pickup. A DNN-based speech presence probability is produced for the current frame, where the SPP value is produced in response to the extracted features being input to the DNN. The DNN-based SPP value is applied to configure a multi-channel filter whose input is the multi-channel speech pickup and whose output is a single audio signal. In one aspect, the system is designed to run online, at low enough latency for real time applications such voice trigger detection. Other aspects are also described and claimed.

21 Claims, 8 Drawing Sheets

(56) References Cited

U.S. PATENT DOCUMENTS

| | | | |
|---|---|---|---|
| 10,121,494 B1* | 11/2018 | Sundaram | G10L 25/51 |
| 10,304,475 B1* | 5/2019 | Wang | G10L 21/0216 |
| 2005/0091050 A1* | 4/2005 | Surendran | G06K 9/00536 |
| | | | 704/226 |
| 2015/0095026 A1* | 4/2015 | Bisani | G10L 15/08 |
| | | | 704/232 |
| 2016/0111108 A1 | 4/2016 | Erdogan et al. | |
| 2016/0322055 A1 | 11/2016 | Sainath et al. | |
| 2017/0061978 A1* | 3/2017 | Wang | G10L 21/0232 |
| 2017/0162194 A1 | 6/2017 | Nesta et al. | |
| 2017/0278513 A1* | 9/2017 | Li | G10L 15/16 |
| 2018/0033449 A1* | 2/2018 | Theverapperuma | G10L 25/30 |
| 2018/0068675 A1* | 3/2018 | Variani | G10L 25/30 |
| 2018/0261225 A1* | 9/2018 | Watanabe | G10L 15/16 |

OTHER PUBLICATIONS

Enzner, Gerald, et al., "Unbiased Residual Echo Power Estimation for Hands-Free Telephony", IEEE, May 13, 2002, 1893-1896.

Erdogan, Hakan, et al., "Improved MVDR beamforming using single-channel mask prediction networks", Mitsubishi Electric Research Laboratories, Sep. 8, 2016, 7 pages.

Heymann, Jahn, et al., "Neural Network Based Spectral Mask Estimation for Acoustic Beamforming", IEEE ICASSP 2016, Mar. 20, 2016, 196-200.

Higuchi, Takuya, et al., "Robust MVDR Beamforming Using Time-Frequency Masks for Online/Offline ASR in Noise", IEEE ICASSP 2016, Mar. 20, 2016, 5210-5214.

Narayanan, Arun, et al., "Ideal Ratio Mask Estimation Using Deep Neural Networks for Robust Speech Recognition", IEEE ICASSP 2013, May 26, 2013, 7092-7096.

Rehr, Robert et al., "Improving the Generalizability of Deep Neural Network Based Speech Enhancement", IEEE/ACM Transactions on Audio, Speech, and Language Processing, vol. XX, No. XX, Sep. 7, 2017, 1-10.

Souden, Mehrez et al., "A Multichannel MMSE-Based Framework for Speech Source Separation and Noise Reduction", IEEE Transactions on Audio, Speech and Language Processing, vol. 21, No. 9, Sep. 1, 2013, 1913-1928.

Souden, Mehrez, et al., "An Integrated Solution for Online Multi-channel Noise Tracking and Reduction", IEEE Transactions on Audio, Speech and Language Processing, vol. 19, No. 7, Sep. 1, 2011, 2159-2169.

Vasilev, Ivan, "A Deep Learning Tutorial: From Perceptrons to Deep Networks", Learning Tutorial: Perceptrons to Machine Learning Algorithms, Nov. 12, 2017, 25 pages.

Xiao, Xiong, et al., "On Time-Frequency Mask Estimation for MVDR Beamforming with Application in Robust Speech Recognition", IEEE ICASSP 2017, Mar. 5, 2017, 3246-3250.

Xu, Yong, et al., "An Experimental Study on Speech Enhancement Based on Deep Neural Networks", IEEE Signal Processing Letters, vol. 21, No. 1, Jan. 1, 2014, 65-68.

Apple Inc., "Online Multichannel Signal Processing with Multiple Output Streams for Far-field Siri on the HomePod," Feb. 28, 2018, 14 pages.

\* cited by examiner

- Multichannel additive model at a given frequency bin (from K total bins) and frame t: $y(t) = x(t) + v(t)$,
  - $y(t) = [Y_1(t) \ldots Y_M(t)]^T$ : M multichannel input signals
  - $x(t) = [X_1(t) \ldots X_M(t)]^T$ : multichannel speech components,
  - $v(t) = [V_1(t) \ldots V_M(t)]^T$ : multichannel undesired signal components

- Covariance matrices of the multichannel undesired signals are estimated using the DNN-based SPP p(t)
  $\alpha_v(t) = \alpha + (1-\alpha)p(t)$
  $R_{vv}(t) \leftarrow \alpha_v R_{vv}(t-1) + (1-\alpha_v(t)) y(t)y(t)^H$,

- Assumption: undesired signals and speech are uncorrelated
  $R_{xx}(t) = R_{yy}(t) - R_{vv}(t)$
  where the covariance matrix of multichannel input signals is recursively estimated as
  $R_{yy}(t) \leftarrow \alpha R_{yy}(t-1) + (1-\alpha) y(t)y(t)^H$

- PMWF-based estimate of the target signal: $s(t) \leftarrow R_{xx}(t)(R_{xx}(t) + \rho R_{vv}(t))^{-1} y(t)$

- $\rho$ is a tuning parameter to achieve a tradeoff between noise reduction and speech distortion
- $s(t)$ is the estimated clean speech and achieves the minimum-mean-square error up to statistical estimation uncertainties.

FIG. 3

DEEP LEARNING DRIVEN MULTI-CHANNEL FILTERING FOR SPEECH ENHANCEMENT

FIELD

An aspect of the invention relates to digital signal processing techniques suitable for use in consumer electronics or automotive electronics, for enhancing a multi-channel digital speech signal to improve voice trigger phrase detection and reduce word error rate by an automatic speech recognizer. Other aspects are also described.

BACKGROUND

In many late model consumer electronics devices such as desktop computers, laptop computers, smartphones, tablet computers, and intelligent personal assistant devices (e.g., intelligent loudspeakers), there are multiple sound pickup channels in the form of two or more acoustic microphones. The microphones produce mixed audio signals, in that they contain sounds from various or diverse sources in the acoustic environment, an extreme example of which is where there are two or more talkers in a room along with background noise (e.g., air conditioner noise) and a media content playback device, during a group conference call. The media content playback device has a loudspeaker that is producing for example the voice of a far end talker during a telephony call, or music or dialog from a podcast, which is also picked up by the microphones (where the latter may be in the same housing as the media content playback device.) In some instances, there may be several intelligent loudspeaker units in the same room, which may lead to further acoustic coupling due to the playback from one loudspeaker unit being picked up by the microphones of another loudspeaker unit. There are thus a variety of acoustic environment conditions, which disturb an otherwise clean speech signal that is picked up by a microphone (as for example the voice of a near end talker in the room.) This hinders real-time applications such as voice trigger phrase detection, hands free telephony, and automatic speech recognition that may be performed upon the speech signal.

SUMMARY

An aspect of the invention is a digital speech enhancement system whose output (enhanced) target signal contains the speech of a talker via a multi-channel speech pickup. The enhanced speech signal may enable accurate voice trigger detection, even during media content playback (e.g., far end talker, or continuing music or podcast playback) accompanied by background noise. Thus, a user-machine session is initiated with reliability, avoiding false triggering that can cause user frustration. The enhanced speech signal also shows promise in reducing the word error rate of a real-time automatic speech recognizer (ASR) whether during media content playback or just in the presence of background noise. The enhanced speech signal may also be beneficial in delivering the near-end talkers voice to a far-end talker in a telephony application, where the far end speech that is being played back is efficiently cancelled or suppressed from the multi-channel speech pickup, so that the uplink communications signal will essentially contain only the near-end talker's speech. The inherent suppression of background noise will also improve human intelligibility so that the far-end talker can better understand the near-end talker's speech, without the quality of the near-end speech being degraded through the introduction of artifacts.

An aspect of the invention is a method for performing multi-channel digital speech signal enhancement using a deep neural network, DNN, also referred to here as a deep learning driven multi-channel filtering process that is suitable for real-time speech enhancement. Generally, the process includes the following operations. A number of features are extracted from a current frame of a multi-channel digital speech pickup and from side information. The side information may be a linear echo estimate, a diffuse signal component, or a noise estimate that has been computed for the current frame of the multi-channel speech pickup. The extracted features are input to a DNN, which produces a DNN-based speech presence probability value, SPP value, for the current frame. The SPP value is applied to configure a multi-channel filter whose input is the multi-channel speech pickup and whose multi-channel output have been combined into a single channel (a single audio signal.) The latter, also referred to here as the enhanced target or speech signal, is expected to contain an enhanced version of the speech of a talker that had been mixed into the multi-channel speech pickup along with other undesired sound sources (e.g., media content playback from a particular loudspeaker unit, and background noise.) The enhanced speech signal may then be provided to for example a voice trigger detector or to an ASR. The process has low enough latency such that the enhanced speech signal can be used by a real-time speech processing application (such as voice trigger detection and ASR), with great accuracy (e.g., low false trigger rate and low word error rate.)

The DNN may have been previously trained during a training phase, in a supervised manner (supervised deep learning) that uses ground truth training examples and human verification. This enables the DNN to accurately model what are effectively the desired and undesired signal characteristics in the multi-channel speech pickup. More specifically, the DNN is configured to produce an SPP value, which is not a binary 0 or 1 voice activity detection decision, but rather a fine-grained, conditional probability value per frequency bin (and per frame of the multi-channel pickup.) The SPP value may "continually" vary, albeit in a discrete range, e.g., 256 values between zero and one. The SPP value is produced by the DNN, not by a statistical estimation block, which is an unsupervised and not machine-learning way of predicting what the target speech is. This also helps the process maintain accuracy in its output enhanced speech signal, by properly inferring the SPP value even when there is an undesired signal in the multi-channel speech pickup that is non-stationary.

In one aspect, the DNN based speech enhancement process is able to accurately track desired and undesired signal statistics, in the form of covariance matrices used by the multi-channel filter, to efficiently suppress the undesired components and preserve target speech components. The multi-channel filter is configured to effectively steer a beamforming null to the direction (or angle) of an undesired sound source, and steer a unit gain beam or lobe to (or having some gain, or a substantial but arbitrary gain in) the direction of a target speech source. The multi-channel filter is effectively acting like a beamformer, although without requiring or receiving a specified direction or angle for either the target speech or the undesired source; the SPP value by itself may be sufficient to fully configure the beamformer function, so as to more accurately estimate the spatial and spectral statistics that configure the multi-channel filter.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The aspects of the invention are illustrated by way of example and not by way of limitation in the figures of the accompanying drawings in which like references indicate similar elements. It should be noted that references to "an" or "one" aspect of the invention in this disclosure are not necessarily to the same aspect, and they mean at least one. Also, in the interest of conciseness and reducing the total number of figures, a given figure may be used to illustrate the features of more than one aspect of the invention, and not all elements in the figure may be required for a given aspect.

FIG. 3 describes an example mathematical model for the multi-channel filter, including how the speech presence probability, SPP, is used to configure a parametric multi-channel Wiener filter element.

DETAILED DESCRIPTION

Several aspects of the invention with reference to the appended drawings are now explained. Whenever the shapes, relative positions and other aspects of the parts described in the aspects are not explicitly defined, the scope of the invention is not limited only to the parts shown, which are meant merely for the purpose of illustration. Also, while numerous details are set forth, it is understood that some aspects of the invention may be practiced without these details. In other instances, well-known circuits, structures, and techniques have not been shown in detail so as not to obscure the understanding of this description.

While digital audio processing techniques have been proposed to enhance a multi-channel speech signal, using so-called batch multi-channel filtering techniques, these are not suitable for real-time applications, because of the need for reduced latency between when the multi-channel speech signal is produced by the microphones and when it is provided as an enhanced target (speech) signal. Now, there are conventional multi-channel filtering approaches that do meet the reduced latency requirements of real-time speech processing applications. Those approaches use unsupervised or statistical estimation techniques which have been found to be inaccurate when the undesired signal that is disturbing the speech is non-stationary or does not match a prior statistical model that has been relied upon (e.g., a Gaussian signal). This failure to properly estimate the undesired signal statistics causes large residual undesired signals, or substantial distortion, in the output speech signal, where both of such artifacts can lead to increased word error rate and improper voice trigger detection.

These solutions are too complex to be easily tuned for a given application, and can be numerically unstable, especially for some real-time applications such as voice triggered intelligent assistants (virtual assistants) in an echo-containing (playback sounds) acoustic environment. A virtual assistant needs to both accurately and rapidly detect an initial voice trigger phrase so that it can respond with reduced latency. To achieve natural human-machine interaction, the virtual assistant should then also be able to produce each recognized word immediately after it has been spoken, yet remain numerically stable to avoid frustrating the user. The virtual assistant should also be computationally light so as to be implementable in a device such as a smartphone that has limited computing resources and limited power consumption levels.

Figure 1:
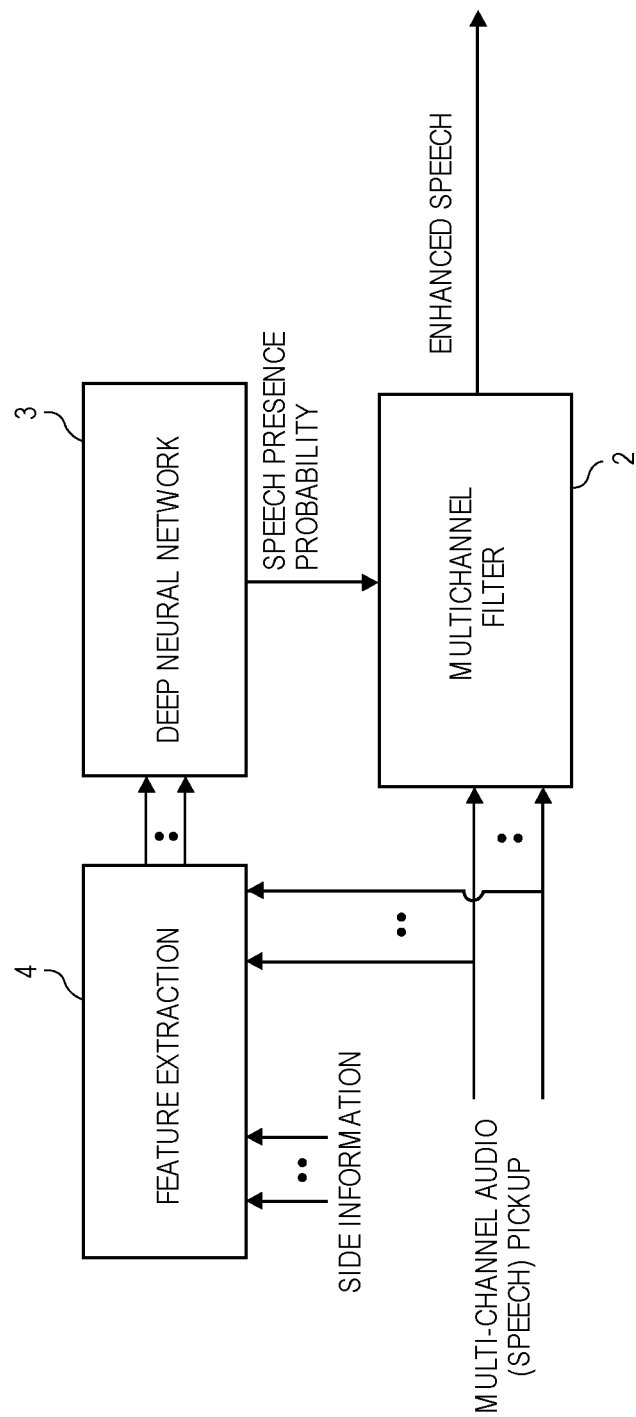
FIG. 1 is a block diagram of a multi-channel digital speech enhancement system.

FIG. 1 is a block diagram of a multi-channel digital speech enhancement system. This may be part of an audio system that captures speech of a talker in a room or inside a vehicle where the audio system is located (also referred to here as a near end talker, for example when there is also a far end talker during a telephony session.) In one aspect, almost all of the components shown in each of the figures here, unless otherwise specified, may be implemented as dedicated electronic circuits, or they may be implemented as one or more data processing components (generically referred to here as "a processor") that execute instructions stored in solid state memory, inside an external housing of a media content playback device. The blocks shown in figures may also represent the process operations (described below in greater detail) of multi-channel acoustic echo cancellation, multi-channel pre-processing, extracting features to be input to a deep learning algorithm, producing an output by the deep learning algorithm, and multi-channel filtering (all of which may be performed in the media content playback device.) Examples of the media content playback device include a smartphone, a tablet computer, a laptop computer, a desktop computer, a speaker dock, a stand-alone intelligent loudspeaker, or an in-vehicle infotainment system. An intelligent loudspeaker can communicate wirelessly and has integrated virtual assistant software and hardware that offers its user interactive actions using a voice trigger phrase.

The speech enhancement system produces an enhanced speech signal that may be used by downstream processes or devices not shown in the figures, such as a voice trigger detection subsystem, a selection process that decides on which stream between multiple speech signal streams to select and provide to an ASR, and uplink voice communication block that incorporates the enhanced speech signal into an uplink communications signal that is transmitted into a communications network (e.g., a cellular telephone network, a voice over Internet protocol telephony network) during a telephony call. Note that in some cases the downstream process may not be implemented in the media content playback device, e.g., the ASR may be implemented in a remote server which receives the selected speech signal stream via a transmission over the Internet from the media content playback device.

As introduced above, a multi-channel audio pickup has mixed therein not just a talker's voice or speech, but also undesired sound such as the voice of another talker nearby (e.g., in the same room or vehicle) or sounds being output by a loudspeaker unit (generically referred to here as media content playback.) Media content playback may include for example sound of a far-end talker during a telephony session, or music or other audio program that is being output by the loudspeaker unit. In some acoustic environments, there is no media content playback (the loudspeakers are silent) yet undesired background sound (background noise) is present and mixed with the desired talker's voice. A multi-channel audio (speech) pickup that contains such mixed audio therein presents a significant challenge when it is input to a real time ASR or an intelligent personal assistant (virtual assistant).

The system depicted in FIG. 1 may be described as an online system in that its latency (or delay) between receiving a frame that constitutes the multi-channel speech pickup and producing its output frame as the enhanced speech signal is low enough to enable a downstream real-time application such as a voice trigger detector or a real time automatic speech recognizer (ASR) to operate robustly and accurately thereby avoiding user frustration. In addition to requiring sufficient computational processing power from the processor and memory that implement the various blocks shown in the figures here, the system is designed algorithmically to be able to process each incoming frame sufficiently rapidly while maintaining the power consumption limits that may be imposed in certain types of systems for example in a smartphone, a laptop computer, a tablet computer, or a space constrained intelligent loudspeaker. The structural aspects of the process that enable its online performance will be described further below.

Figure 4:
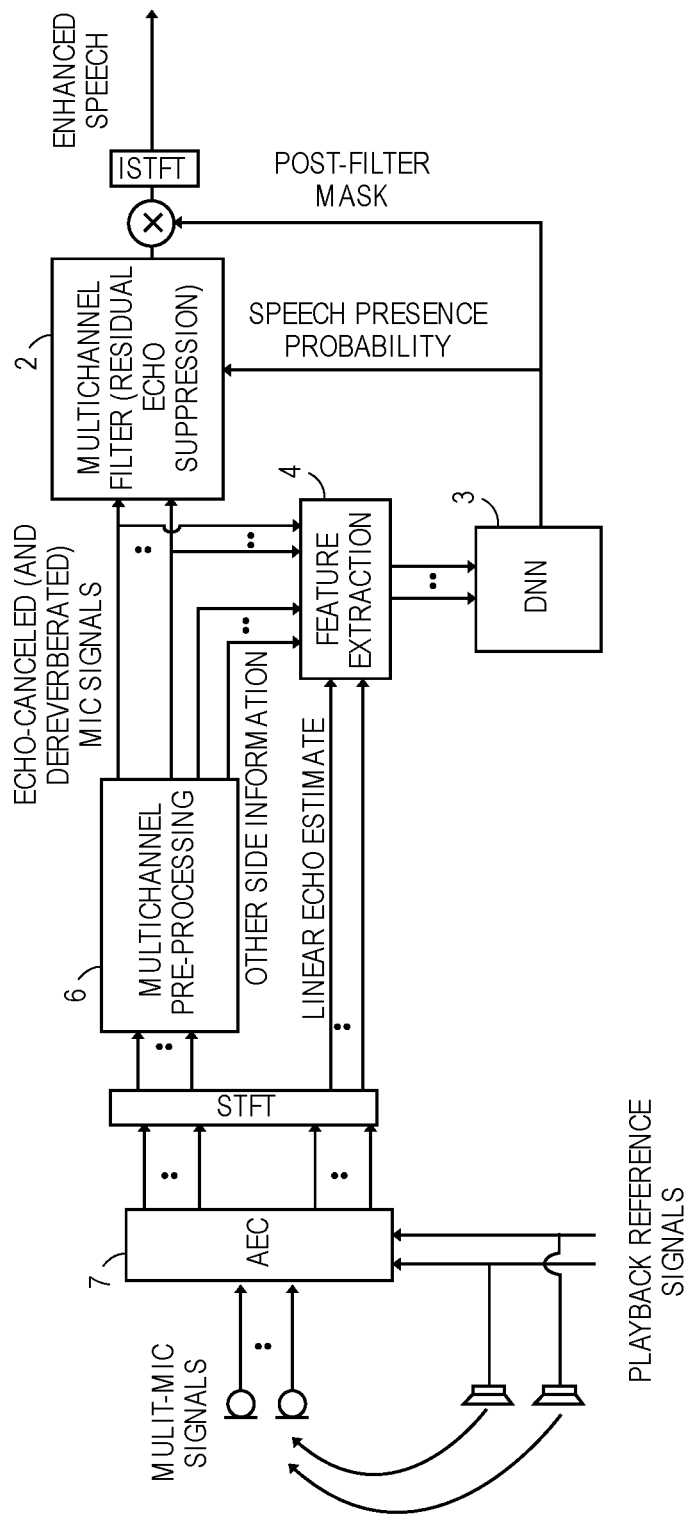
FIG. 4 is a block diagram of a multi-channel echo cancellation and residual echo suppression system.

Referring to FIG. 1, the multi-channel speech pickup may include a number of acoustic microphone signals that are produced by a number of acoustic microphones, respectively (not shown in FIG. 1 but see for example FIG. 4). The microphones may be integrated into an external housing of the media content playback device, where the external housing may also be generically referred to here as a loudspeaker cabinet. The loudspeaker cabinet contains one or more loudspeaker drivers that can produce media content playback, which is treated as undesired sounds simultaneously with the desired speech pickup. The multi-channel speech pickup thus includes a number of digital audio signals where each may be in the form of a sequence of frames that reflect the contemporaneous acoustic pickup of a sound field or acoustic environment where a person is talking (a talker).

The system in FIG. 1 also includes a feature extraction block 4 that extracts a number of features from a current frame of the multi-channel speech pickup, and from side information. A feature may be the magnitude of a frequency bin (frequency bin magnitude), or also referred to here as a spectral magnitude, selected from any of the multiple microphone signals or from the side information. The side information may include one or more parameters, e.g., a linear echo estimate, a diffuse signal component, or a noise estimate, that have been computed for the multi-channel speech pickup. In one aspect, the side information may also include inter-microphone coherence that captures spatial information, or direction of arrival, about a sound source. In addition or alternatively, the side information may also include directional features such as inter-channel (inter-microphone) phase differences or steered response power with phase transform spatial spectrum.

The extracted features include selections from the current frame of the multi-channel speech pickup. In some instances, the features extracted from the current frame may be stacked with features extracted from one or more past frames or one or more future frames, so as to obtain greater information on the temporal dynamics of the signal statistics. However, in one aspect, in the interest of achieving an online process that has reduced latency, the features are extracted from each current frame of the multi-channel speech pickup (and from the side information that has been computed for the current frame), and not from any future frames (so to maintain causality of the overall process), and in some cases not from any past frames either so as to reduce computation complexity and further reduce latency. To further promote the desired reduction in latency of an online process, the extraction of features from each frame or from the side information concerning that frame is performed without additional external inputs such as computed hints or guesses that the current frame, or a segment of several consecutive frames, of the multi-channel speech pickup contains speech versus noise (undesired sounds.) In other words, the feature extraction block 4 may select its features without relying on any external hints or guesses such as that provided by voice activity detection (VAD) algorithms (e.g., the current frame is likely to contain speech versus noise.)

The features extracted from side information may be selected spectra (frequency domain values) from each of the individual audio signals that make up the multi-channel speech pickup, taken from different tap points in a chain or sequence of multi-channel audio pre-processing blocks that operate upon the multiple microphone signals. Though not shown in FIG. 1, these blocks would be downstream of the microphones and upstream of a multi-channel filter 2. Those blocks may include a noise estimation block or an acoustic echo canceller (AEC) (not shown in FIG. 1 but see FIG. 4 described below.) The features extracted from the side information may include spectra taken from a linear echo estimate that has been determined (computed) by the AEC. Alternatively, or in addition, the extracted features may include spectra taken from a dereverberated version of an echo cancelled signal (again not shown in FIG. 1 but see FIG. 4 described below). Yet another side information source for the extracted features may be the spectra produced by a noise statistics estimator or tracker that produces noise estimates for each frame of the multi-channel speech pickup using a statistical approach.

The noise statistics tracker may be operating upon the multi-channel pickup stream at a point that is at the output of the AEC (again this aspect will be described below in connection with FIG. 4.) The side information may also include a diffuse signal component produced by a dereverberation algorithm that may be operating upon the multi-channel pickup stream, at the output of the AEC. The side information may also include inter-microphone coherence that captures spatial information, or direction of arrival, about a sound source. The side information may also include directional features such as inter-channel (inter-microphone) phase differences or steered response power with phase transform spatial spectrum.

The feature extraction block 4 and the other components of the system operate in a time-frequency framework where each frame of digitized audio from the multiple microphones is converted into frequency domain. In the examples illustrated in the figures here, this time to frequency transform is a windowed Short Time Fourier Transform (STFT), and the features are thus extracted from the windowed STFT domain. However, other domains for feature extraction are possible, including Mel-frequency bins of a perceptual weighted domain conversion, or a gammatone filter bank of a perceptual weighted domain (of the multi-channel speech pickup.)

Still referring to FIG. 1, the extracted features are provided as inputs to a DNN 3, which in response produces as its output a speech presence probability value, SPP value, for the current frame. Examples of the DNN 3 include those that have a feed-forward architecture, a recurrent neural network (e.g., long short term memory, LSTM, network) and densely connected convolutional networks (e.g., DenseNet). The DNN 3 updates the SPP in this way, for each incoming frame of the multi-channel speech pickup (in response to a new set of input features to the DNN 3.) In other words, the SPP value is produced by the DNN 3 in response to the extracted features (provided by the feature extraction block 4) being input to the DNN 3 for the current frame of the multi-channel speech pickup.

The DNN 3 has been trained offline in a supervised manner, with a human involved in the process of inputting ground truth features to the DNN 3 and verifying the validity of the resulting output SPP value, while enabling the DNN 3 to learn the relationship between the input features and the output SPP. The input features that are provided to the DNN 3 during training have been extracted from the multi-channel speech pickup in certain selected acoustic conditions. Verification by the human who is supervising the training of the DNN 3 is performed, where the human may be responsible for determining how to adjust the hidden layers, including the weights and connections between neurons of the DNN 3.

The DNN 3 may be trained to compute its SPP values in various types of acoustic environments in which the microphones find themselves. For example, there may be several instances of an acoustic environment that is primarily speech and some background noise, and several instances of another environment that is primarily speech and echo due to contemporaneous media content playback. A single DNN may be trained (to compute the SPP) in both of those different acoustic conditions. In another aspect, however, illustrated in FIG. 6 discussed below, a single DNN may be trained to compute its SPP in only one type of acoustic environment, e.g., primarily speech and contemporaneous media content playback but no background noise.

The DNN 3 may be designed to produce the SPP value as a fine-grained, conditional probability value, per frequency bin. The SPP value is not a binary (0 or 1) voice activity detection decision, but rather "continually" varies in a discrete time range, say 256 values between zero to one (that being just an example, of course.) The SPP value is not produced by a statistical estimation block calculation, as the latter is unsupervised or does not have a machine-learning algorithm. The SPP value is a prediction of what speech is in the input features provided to the DNN 3, as computed by a deep learning algorithm that has been trained in a supervised manner.

To promote an online process by reducing latency, the DNN 3 may be made computationally less complex by selectively reducing the number of input features. This may be done by for example inter-frequency bin smoothing where the gain values of several neighboring frequency bins are combined, e.g., averaged, into one gain value, and/or by inter-channel smoothing where the gain values in the same frequency bin of two or more channels of the multi-channel speech pickup are combined, e.g., averaged, into one gain value for that frequency bin. As suggested above, however, the DNN 3 may be designed to accept additional features from one or more past frames of the multi-channel speech pickup where those features are additional inputs to the DNN 3 when producing the SPP value. For example, in addition to features extracted from the current frame, there may be features extracted from a single, "combined past frame" which is a combination, e.g., average, of several previous frames. While this increases computation complexity relative to a "current frame only" DNN, it may improve accuracy of the overall process due to dynamic signal statistics being captured by the past frames.

Figure 2:
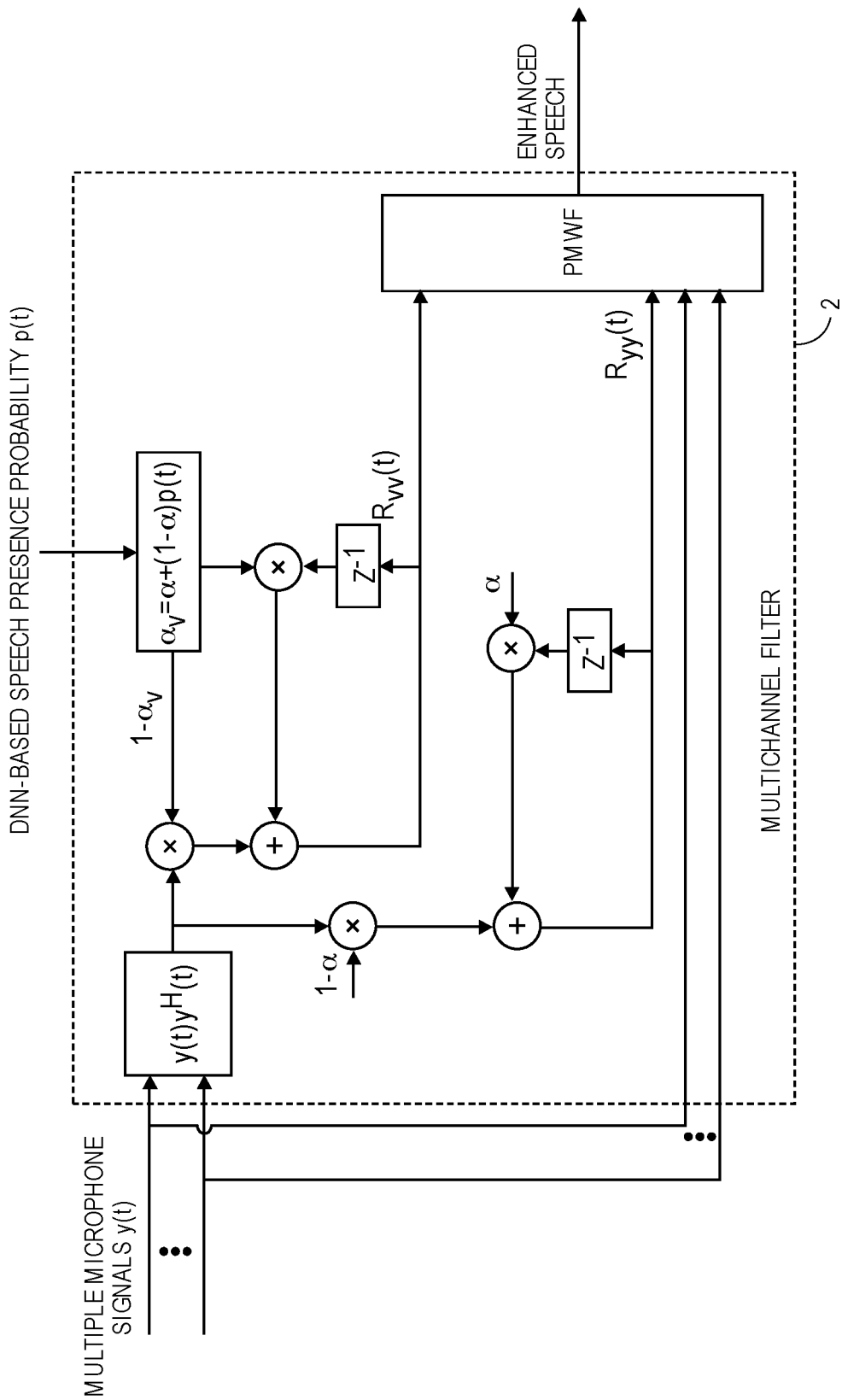
FIG. 2 depicts an example of a multi-channel filter driven by DNN-based SPP.

Still referring to FIG. 1, the feature extraction block 4 and the DNN 3 have been described as together working to generate the SPP value for each frame of the multi-channel speech pickup. The SPP value then configures the multi-channel filter 2, whose input is the multi-channel speech pickup and whose output is the enhanced speech signal as a single audio signal. An example of the multi-channel filter 2 is shown in FIG. 2. The multi-channel filter 2 generally speaking is an estimating type (statistically based) adaptive noise reduction process that applies matrix operations to the current frame of the multi-channel speech pickup, so as to compute an estimate of a target (speech) signal that has been mixed into the multi-channel speech pickup along with undesired signals. In the particular example shown in FIG. 2, a parametric multi-channel Wiener filter, PMWF, is used to perform the matrix operations. The SPP value configures the inputs to the PMWF, and more specifically the covariance matrices of the multi-channel undesired signals Rvv(t) and the covariance matrix of the multi-channel speech pickup which is estimated as Ryy(t). The schematic in FIG. 2 illustrates how Rvv and Ryy are recursively computed for each instance or value of SPP that is received. Those covariance matrices are then applied by the PMWF to the current frame of the multi-channel pickup (here, a matrix of multiple microphone signals, y(t)), to produce an estimate of the desired speech as an estimated, clean speech matrix. For example, if there are M speech pickup signals (M microphone signals y(t)) each having N frequency bins, then the PMWF may have M output signals each having N frequency bins. FIG. 2 shows a single output line for the multichannel filter 2, signifying that the M output signals of the PMWF each having K frequency bins have been combined into a single channel (vector) having K frequency bins, for example by power averaging across the M outputs of the PMWF.

Note that the PMWF can be tuned for at least two different purposes described here, namely noise reduction in general, when echo (media content playback) is absent from the acoustic environment, or more specifically residual echo suppression when echo is present (to be described in FIG. 4 below.)

In one aspect, an "online" version of the multichannel filter 2, such as the one depicted in FIG. 2, only needs as its signal input the current frame of the multi-channel speech pickup, not any past or future frames. This is done in the interest of promoting reduced latency for the overall process, where the features that are input to the DNN 3 are extracted from each current frame of the multi-channel speech pickup (and from the side information that has been computed for the current frame), and not from any future frames (so to maintain causality of the overall process.) In some cases the input features are not extracted from any past frames either so as to further reduce computation complexity and latency.

It is interesting to note here that the SPP value may be all that is needed in terms of input control, to update the spatial covariance matrices of the multi-channel filter 2 for each frame, when the system deployed (or during in the field use.) Nevertheless, the multi-channel filter 2 so configured may be viewed as an adaptive beamformer whose digital filter coefficients are continually being updated (frame by frame) in a way that effectively steers a null in the direction of an undesired sound source, while maintain pickup gain in the direction of a desired source (e.g., that of a talker in the acoustic environment). In other words, a spatial aspect of the desired sound source is addressed or determined by the multi-channel filter 2, in a way that may not have been addressed or determined by upstream processing of the multi-channel speech pickup. Note again that the SPP value does not specify a direction or expected direction of arrival. Nevertheless, the SPP value by itself has proven to be sufficient to configure the multi-channel filter 2 so as to effectively steer a null in the direction of an undesired sound source.

As shown in the particular example of FIG. 3, the SPP value drives the spatial statistics for the desired signal and the spatial statistics for the undesired signal, according to mathematical formulas that yield the covariance matrices Rvv and Ryy, which in turn are applied by the PMWF to the current frame of multi-channel speech pickup. Note however that other multi-channel filter approaches are possible that do not use a PMWF, such as those that use a minimum variance distortionless response (MVDR) filter or a generalized sidelobe canceller (GSC.)

Turning now to FIG. 4, a block diagram of a multi-channel echo suppression and residual echo suppression system is shown that has improved performance (a "cleaner" enhanced speech signal at the output), relative to single channel statistical approaches that may be conventionally used for residual echo suppression. In state of the art conventional algorithms, statistical approaches are used to determine the residual echo statistics that are needed by a residual echo suppression filter, which is acting upon an echo cancelled signal. However it is challenging to estimate this residual echo particularly in an acoustic environment in which there is double talk (a near-end talker and a far-end talker are talking simultaneously in a telephony session). Often, in the double talk scenario, there is an undesirable gating or muting of the near-end talker's speech during the double talk intervals. The statistical approaches also tend to either overestimate or underestimate the residual echo level, which leads to artifacts such as speech distortion and musical noise (in the enhanced audio signal). The musical noise is of course unpleasant to the far-end talker in the telephony session, while speech distortion may be detrimental to the performance of voice trigger detection and also ASR.

The speech enhancement system in FIG. 4 performs acoustic echo cancellation, by an AEC block 7, upon a number of microphone signals to effectively produce the multi-channel speech pickup as a number of echo cancelled audio signals, respectively. The AEC block 7 may perform any suitable conventional acoustic echo cancellation algorithm that is configured to receive as input one or more playback reference signals. The playback reference signals represent inputs to a corresponding number of speaker drivers which may be integrated in the same loudspeaker cabinet as the microphone signals that are producing the multi-channel speech pickup. The AEC block 7 produces a number of linear echo estimates associated with the echo cancelled audio signals, respectively.

In FIG. 4, these echo cancelled signals and linear echo estimates are converted into frequency domain from the output of the AEC block 7, by the STFT block, before being fed downstream in the signal processing chain. In this aspect, the feature extraction block 4 now receives as side information the linear echo estimates (from which it extracts a number of features that are input to the DNN 3). The DNN 3 in this aspect has been trained with input features that include not just spectra selected from the current frame of echo cancelled signals but also spectra selected from the associated linear echo estimates, to produce as its output feature an SPP value that estimates the probability of the target speech being present in each frequency bin of the current frame of the echo cancelled signals.

Now, since the echo cancelled signals may still contain residual echo, in this aspect the multi-channel filter 2 effectively performs multi-channel residual echo suppression upon those echo cancelled signals (the multi-channel speech pickup.) Similar to FIG. 1, the multi-channel filter 2 is configured in accordance with the SPP value produced by the DNN 3, for each current frame of the multi-channel speech pickup. However in this case, the SPP value is used in the multichannel filter 2 to infer a multichannel residual echo power spectral density, PSD, matrix—see FIG. 2 which also shows that the matrix is then provided to the PMWF which in turn suppresses the residual echo to produce the enhanced speech signal.

FIG. 4 also shows another aspect, namely where dereverberation is performed upon the echo cancelled signals (to produce the multi-channel speech pickup at the input of the multi-channel filter 2.) The dereverberation algorithm may be performed by a multi-channel pre-processing block 6, which more generally may include one or more pre-processing operations that are performed on the multi-channel pickup (before it is input to the multi-channel filter 2.) Examples include diffuse noise statistics estimation that can be performed upon the echo-cancelled signals. The dereverberation algorithm may produce a number of output dereverberated signals (corresponding to the same number of echo-cancelled signals), in which the direct sound path from a desired sound source has been enhanced. The dereverberation algorithm may also provide as a by-product an estimate of the reverberation, also referred to here as a diffuse signal component. In this aspect, the feature extraction block 4 may extract features from additional side information provided by the multi-channel pre-processing block 6, such as selected spectra from a noise statistics tracker and/or a diffuse signal component (reverberation amount) being the by-product estimate of the dereverberation algorithm. The DNN 3 now has additional input features that have been extracted from a multi-channel reverberation estimate (produced by the dereverberation algorithm that may be running as part of the multi-channel pre-processing block 6).]

Although not illustrated in the figures, the multichannel pre-processing 6 may also have components in its signal processing chain, such as a noise estimation block or a noise statistics tracker, that are performed upon the multi-channel speech pickup at a point that is upstream of the AEC block 7. The noise statistics tracker may also provide side information to the feature extraction block 4 from which input features for the DNN 3 can be selected.

It should be noted that the multi-channel pre-processing block 6 may be bypassed if desired to meet lower computational requirements or lower power consumption, as a lightweight digital signal processing solution for the digital speech enhancement system.

FIG. 4 is used to illustrate yet another aspect of the invention, namely where the SPP value produced by the DNN 3 is also applied as a post-filter spectral mask (by a multiplier or mixer block as shown), downstream of the multi-channel filter 2. In other words, the figure shows an example of applying the SPP value as a spectral mask to the output of the multi-channel filter 2, prior to transforming the output of the multi-channel filter 2 into time domain. This is designed to further enhance the output speech signal. The post-filter mask is applied in the frequency domain, prior to the transformation back to time domain by the inverse STFT block, ISTFT. The application of the post-filter mask is computationally lightweight, however it is optional and may depend on the desired trade off between performing additional noise reduction versus increased speech distortion. In other words, if less speech distortion is desired while additional noise may be tolerated in the enhanced audio signal, the application of the post-filter mask may be omitted.

Some advantages of the multi-channel residual echo suppression system of FIG. 4 include more accurate and faster convergence than traditional approaches that compute the SPP values using statistical approaches, and less distortion of the target speech by using multi-channel filtering. The latter may significantly reduce residual echo by taking advantage of the spatial as well as spectral characteristics of both the target speech and the undesired sounds in the echo cancelled version of the multi-channel pickup. The spatial characteristics include for instance reflections of sound from the loudspeakers due to the playback reference signals, from walls in a room). Residual echo is non-stationary, and as such a DNN can be more accurate and may exhibit faster convergence when computing the SPP value than traditional statistical approaches.

Also, the DNN 3 has input features that have been extracted from the echo cancelled microphone signals and also from their corresponding linear echo estimates (both produced by the AEC block 7). These spectral characteristics of the residual echo can be efficiently learned using a DNN. When using both of these inputs, the DNN can be trained to infer the SPP value reliably in the presence of non-stationary residual echo.

Figure 5:
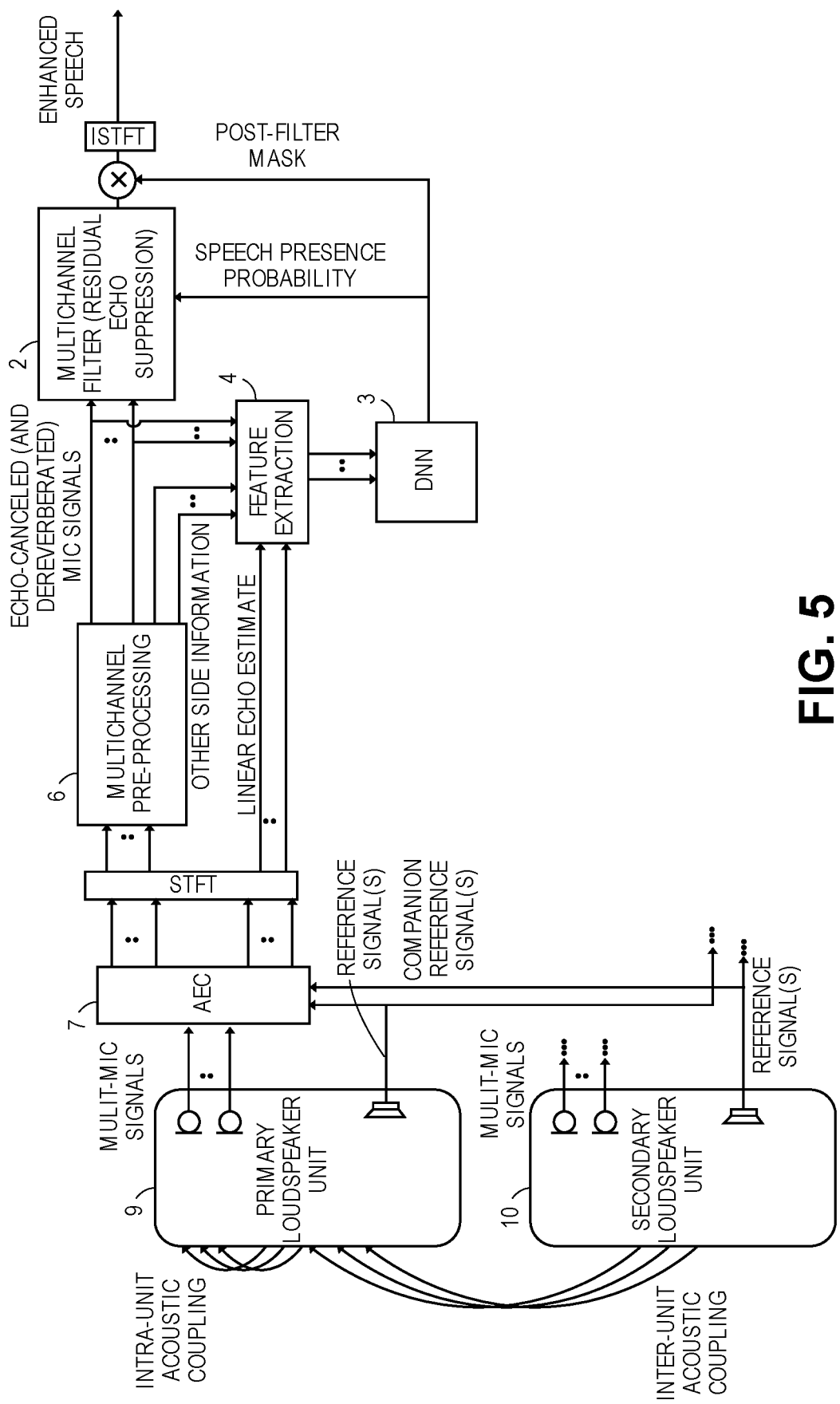
FIG. 5 illustrates the multi-channel echo cancellation and residual echo suppression system in the case where there are multiple loudspeaker units that are producing the media content playback acoustic coupling.

Turning now to FIG. 5, this is a block diagram of the multi-channel echo suppression and residual echo suppression system in the case where there are two or more loudspeaker units 9, 10, where each unit may have its own loudspeaker cabinet. Each unit is performing media content playback of its respective reference signals. The reference signals may be digital, loudspeaker driver signals that have been produced by an external audio source (such as a smartphone or a tablet computer, not shown) in response to decoding an audio program, e.g., a primary reference signal representing a left stereo channel for the primary loudspeaker unit 9, and a secondary reference signal representing a right stereo channel for the secondary loudspeaker unit 10. Note that there may be more than one reference signal, corresponding to more than loudspeaker driver, in each loudspeaker unit.

The acoustic environment in FIG. 5 contains two sources of echo, namely intra-unit acoustic coupling from the "local" loudspeaker drivers that are in the same loudspeaker cabinet as the primary loudspeaker unit 9, but also inter-unit acoustic coupling from the loudspeaker drivers that are in the secondary loudspeaker unit 10. The AEC block 7 receives as input not only the primary playback reference signals but also the secondary playback reference signals as shown. Thus, the linear acoustic echo estimates produced by the AEC block 7 now capture the linear portions of both intra-unit and inter-unit acoustic couplings, which then inform the DNN 3 (via the feature extraction block 4) on the actual remaining residual echo that needs to be suppressed.

The elements of the multi-channel speech enhancement system in FIG. 5, including the AEC block 7, STFT, multi-channel pre-processing 6, . . . , and the ISTFT may be implemented by a programmed processor that is also within the cabinet housing of the primary loudspeaker unit 9. The operation of the system in FIG. 5 may be the same as the system in FIG. 4, except that the AEC block 7 now produces its echo cancelled microphone signals and the linear echo estimates using not just the primary reference signals but also the secondary reference signals that have been received for example wirelessly from the secondary loudspeaker unit 10. Of course, implied here is that the received secondary reference signals are time synchronized to the primary reference signals, which in turn are also synchronized to the multiple microphone signals that are produced by the microphones of the primary loudspeaker unit 9.

Although not shown in FIG. 5, the speech enhancement system that is shown as operating upon the microphone signals of the primary loudspeaker unit 9 may be replicated in the secondary loudspeaker unit 10. In other words, the loudspeaker cabinet of the secondary loudspeaker unit 9 may have therein, in addition to a second group of acoustic microphones and one or more local loudspeakers drivers that are shown, a second signal processing chain that may be substantially identical to what is shown in FIG. 5 (AEC block 7, STFT, multichannel pre-processing block 6, feature extraction 4, DNN 3, multichannel filter 2, and ISTFT) to thereby produce a second enhanced speech signal. A higher layer selection process (not shown) may then evaluate first enhanced speech (from the primary loudspeaker unit 9) and the second enhanced speech signal (from the secondary loudspeaker unit 10), to for example select one over the other for purposes of subsequent voice trigger detection processing or real time ACR.

The assistance given from the secondary loudspeaker unit 10 to the speech enhancement process that is running in the primary loudspeaker unit 9 may be reciprocated. In other words, each "local" signal processing chain (co-located with its multiple microphones and speaker drivers in the same loudspeaker cabinet) that produces a local enhanced speech signal does so while receiving "companion" reference signals and perhaps companion side information, from another loudspeaker cabinet, thereby allowing each local signal processing chain to produce its own improved, enhanced speech signal. In this aspect, each loudspeaker unit would contain a wireless transmitter that may transmit its local playback reference signals and perhaps its side information (e.g., its linear echo estimates) to another loudspeaker unit, to further assist the speech enhancement process that is running in the other loudspeaker unit. For example, the extracted features that are input to the DNN 3 of the primary loudspeaker unit 9 may include features that have been extracted from side information that has been received from the secondary loudspeaker unit 10. The provision of the "companion" reference signals from the secondary loudspeaker unit to the primary loudspeaker unit, and perhaps with the additional side information (e.g., linear acoustic echo computed by the signal processing chain of the secondary loudspeaker unit 10) may assist the multi-channel filter 2 of the primary loudspeaker unit 9 to more accurately steer a null in the direction of the secondary loudspeaker unit 10. This may result in greater residual echo suppression (by the multi-channel filter 2 of the primary unit 9) as compared to a traditional single channel residual echo suppression system.

Figure 6:
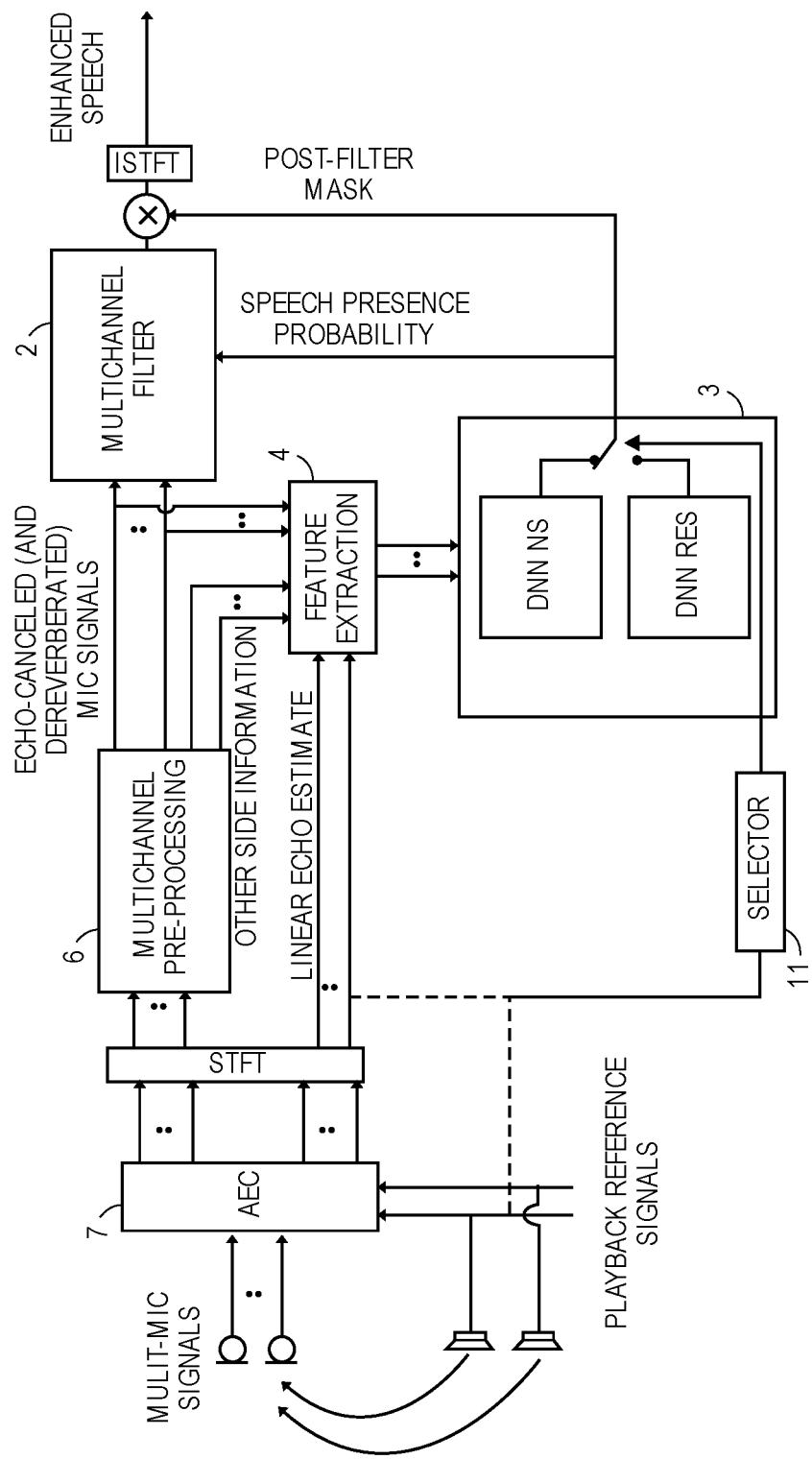
FIG. 6 is a system for performing speech signal enhancement that has two DNNs for use in two different acoustic environments, one for configuring the multi-channel filter for noise suppression and the other for configuring the multi-channel filter for residual echo suppression.
Figure 7:
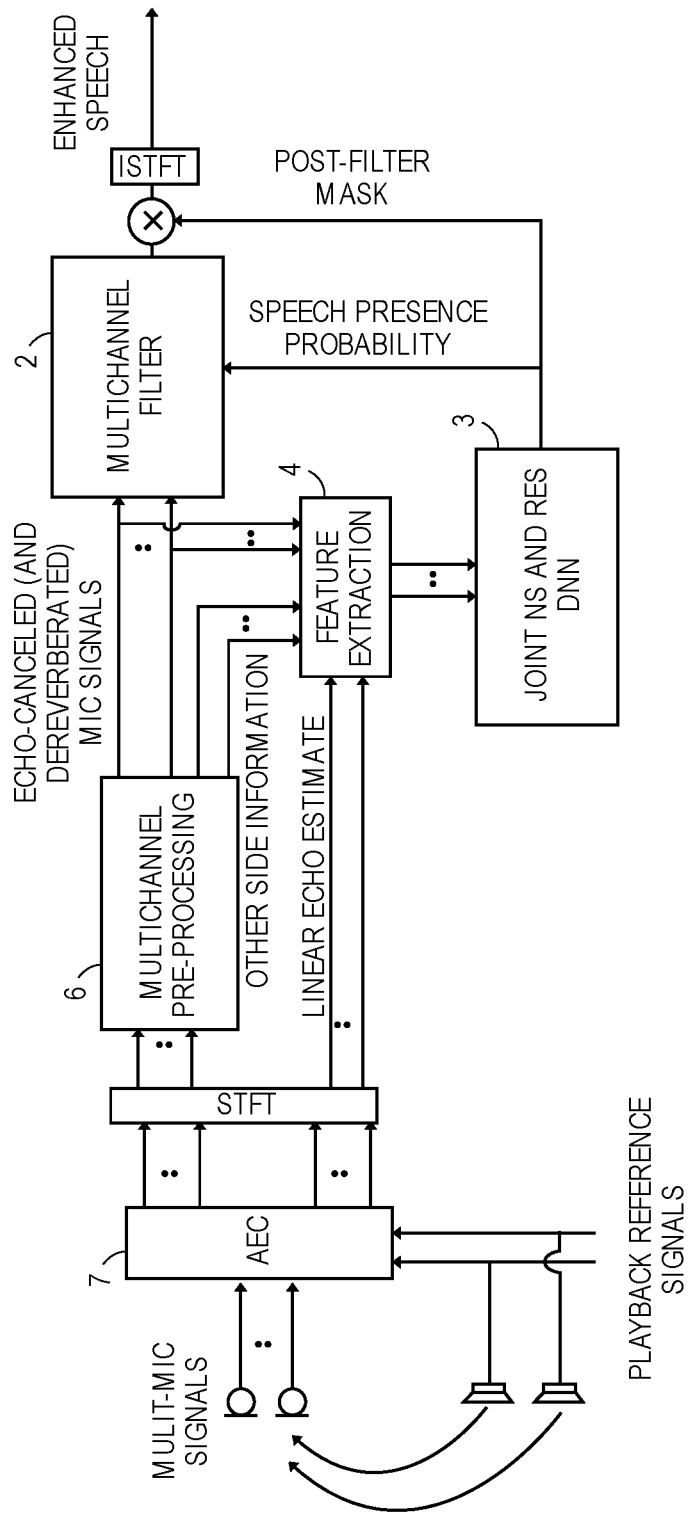
FIG. 7 is a multi-channel speech signal enhancement system that uses a joint noise suppression and residual echo suppression DNN.

The acoustic environments contemplated above include one where there is primarily speech plus background noise, and another where there is primarily speech plus echo due to the presence of media content playback. A single DNN may be been trained to estimate SPP in both of those conditions, as shown in FIG. 7 which is described further below. However, using a single DNN to estimate the probability of speech in both conditions may be challenging since background noise and residual echo have different spectral characteristics. To meet this challenge, another aspect of the invention is illustrated in FIG. 6 as a system that can automatically configure itself for both types of acoustic environments, where the DNN 3 alternates between two configurations, namely a first DNN that is to be used when the undesired signal is predominantly background noise (DNN NS) and a second DNN that is to be used when the undesired signal is predominantly residual echo from the presence of media content playback (DNN RES.) In other words, each single DNN is trained here to estimate SPP in one, not both, of those two different acoustic conditions, and may thus be more accurate than a DNN that is "shared" by being trained in both of those different acoustic conditions.

Still referring to FIG. 6, a selector 11 selects one of the DNNs to produce the SPP that configures the multi-channel filter 2, and this selection may depend upon some determination about the present acoustic condition. The present acoustic condition may be determined by the selector 11 evaluating the playback reference signal or the linear echo estimate. For instance, if the strength of the reference signal, or the strength of the linear echo estimate, is below a given threshold, then the DNN NS is selected. The DNN NS was trained in a primarily speech plus background noise environment (no playback from the loudspeakers), and so it is selected to configure the multi-channel filter 2 as a background noise suppressor. If however the strength is above the given threshold, then media content playback is likely present in the present acoustic condition, such that the DNN RES is selected to configure the multichannel filter 2 as a residual echo suppressor (because the DNN RES was trained in an acoustic condition that contained speech plus echo due to playback.)

In the system of FIG. 6, the production of the SPP values may alternate as between a first DNN (e.g., DNN NS) and a second DNN (e.g., DNN RES). In such a process, the following additional operations may be performed upon a subsequent or new frame (in addition to those described above as being performed upon a previous or older frame, by the system in FIG. 2 or by the system in FIG. 4): a second group of features are extracted (by the feature extraction block 4) from i) a new frame of the multi-channel speech pickup and ii) second side information being a diffuse signal component of the multi-channel speech pickup or a noise estimate for the multi-channel speech pickup; an output of a second DNN is produced, as a second DNN-based speech presence probability value (second SPP value) for the new current frame, wherein the second SPP value is produced by the second DNN in response to the extracted second group of features being input to the second DNN; and the second SPP value is applied to configure the multi-channel filter. Selecting between the first DNN and the second DNN may be as follows: in response to detecting an absence of playback reference signals, the second DNN is selected (to produce the second SPP value which configures the multi-channel filter); but in response to detecting the presence of a playback reference signal, the first DNN is selected (to produce the first SPP value which configures the multi-channel filter.)

FIG. 6 also shows another optional aspect of the invention, where the SPP produced by either the DNN NS or the DNN RES is also used as a post-filter mask, similar to what was described or illustrated above in connection with FIG. 4 and FIG. 5), to provide further noise reduction (at the risk of introducing additional artifacts or distortion into the enhanced speech signal.)

Turning now to FIG. 7, another aspect is shown where the speech enhancement system is similar to the one in FIG. 4 except that the DNN 3 has now been trained to estimate the speech presence probability in both of the acoustic conditions defined above in connection with FIG. 6. The single DNN is now informed, alternatively, with the input features of the DNN RES and the input features of the DNN NS, to automatically adjust its weights and connection between neurons accordingly (depending on the present acoustic conditions.) In other words, in one acoustic environment, the feature extraction block 4 produces the input features that it would for the DNN RES, while in another acoustic environment the feature extraction block produces the input features that it would for the DNN NS. This single-DNN version of the DNN 3 uses less memory than the dual DNN version of FIG. 6.

Figure 8:
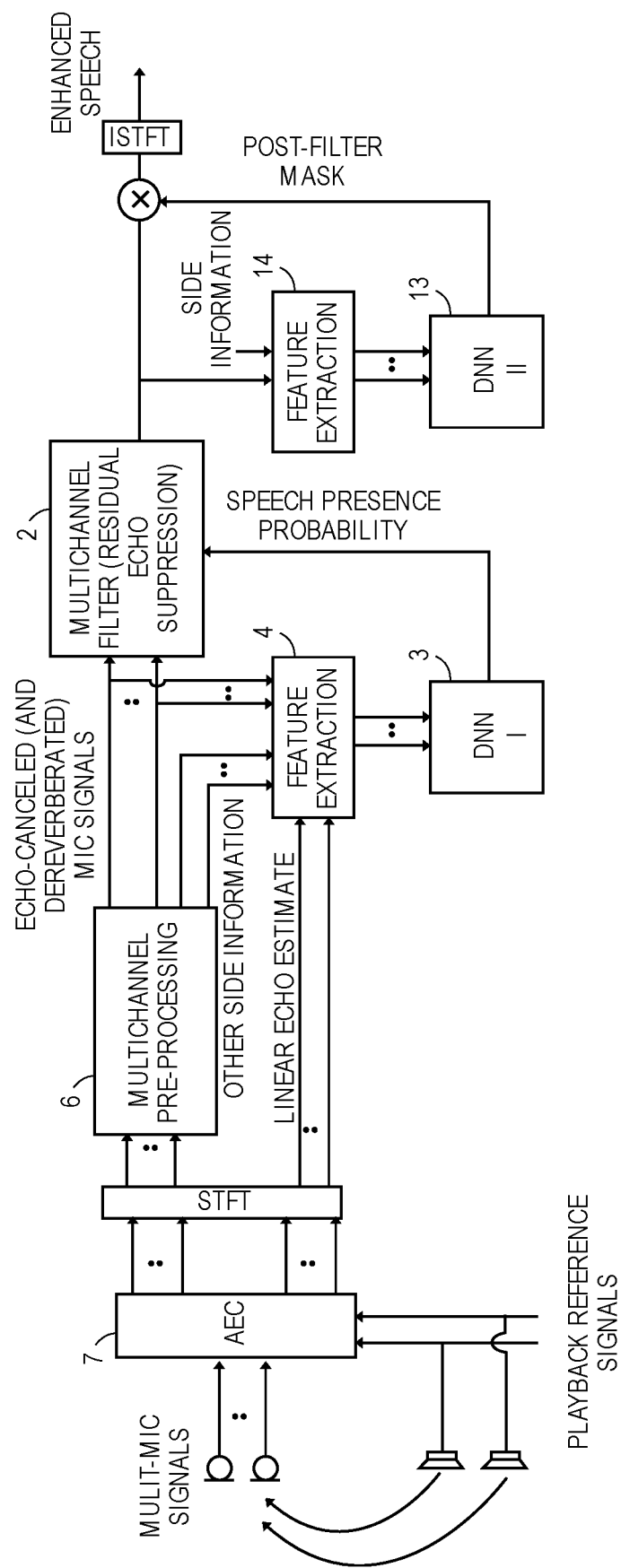
FIG. 8 is a speech signal enhancement in which a post filter spectral mask is generated by a DNN whose feature inputs are extracted from the output of the multi-channel filter.

Turning now to FIG. 8, another aspect of the invention is shown where the speech enhancement system is similar to FIG. 4 in that the AEC block 7 produces echo cancelled signals and linear echo estimates, the multi-channel pre-processing block 6 produces dereverberated, echo cancelled signals as well as side information (such as diffuse signal component statistics) and the multi-channel filter 2 performs noise suppression upon the multi-channel speech pickup (in this case being the dereverberated and echo cancelled multi-microphone signals). Here, the DNN 3 (now labeled as DNN I) has been trained to estimate the probability of speech presence in both types of acoustic conditions (speech+background noise and speech+residual echo due to the presence of media content playback). The SPP value produced by the DNN I configures the multi-channel filter 2 in accordance with the techniques described above for example those in connection with FIG. 2 and FIG. 3. The multi-channel filter 2 thus suppresses the undesired signals, be it background noise and/or residual echo. Here however instead of the arrangement of the PMWF shown in FIG. 2, a minimum variance distortionless response (MVDR) is used to reduce the likelihood of speech distortion appearing in the enhanced speech signal at the output of the multi-channel filter 2. Also, a second DNN 13, DNN II, is added which computes a fine-grained post-filter mask, which is then applied to modulate the components of the output of the multi-channel filter 2. The mask computed by the DNN II may be an ideal ratio mask (IRM). The input features to the DNN II may be extracted as described above, except that they are extracted from the enhanced speech signal at the output of the multi-channel filter 2. Side information may also be used from which additional features may be extracted and provided to the DNN II, in order to achieve a more precise IRM.

Although FIG. 8 shows the embodiment where the output of the multi-channel filter 2 is a single channel (a single audio signal which may have been obtained as described above by combining the multiple output signals that correspond to the M microphone signals), an alternative is to configure the DNN II to produce a separate mask vector for each microphone signal, such that each mask vector is then multiplied by its corresponding microphone channel at the output of the multi-channel filter 2. The application of the post-filter mask in this manner, and in both instances, may further reduce the residual noise at the output of the multi-channel filter 2. This may be summarized as follows:

---

Multichannel additive model at a given frequency bin and frame t:
s(t) ~ x(t) + r(t),
　　$s(t) = [S_1(t) \ldots S_M(t)]^T$ : output of the multichannel residual echo/noise suppression filter at M frequency bins
　　$x(t) = [X_1(t) \ldots X_M(t)]^T$ : desired multichannel speech components
　　$r(t) = [R_1(t) \ldots R_M(t)]^T$ : residual undesired signal (noise or residual echo) components
DNN II estimates the single channel mask per microphone, e.g., for microphone m:
　　$q_m(t) \sim |X_m(t)|/|S_m(t)|$
The $m^{th}$ enhanced signal is given by: $q_m(t)S_m(t)$

---

While certain aspects have been described and shown in the accompanying drawings, it is to be understood that such aspects are merely illustrative of and not restrictive on the broad invention, and that the invention is not limited to the specific constructions and arrangements shown and described, since various other modifications may occur to those of ordinary skill in the art. For example, in the case of a smartphone, there may also be contemporaneous non-acoustic pickup of the talker's voice, by way of bone conduction sensors in the smartphone or in a head-worn audio pickup device (e.g., a headset) by the talker. Thus, while the acoustic microphones may be integrated into the housing of a content playback device such as an intelligent loudspeaker, the multi-channel speech pickup may also include a non-acoustic speech pickup signal as well. The description is thus to be regarded as illustrative instead of limiting.

What is claimed is:

1. A method for producing an enhanced speech signal using a deep neural network, DNN, comprising:
　extracting a plurality of features from i) a current frame of a multi-channel speech pickup and ii) side information selected from a linear echo estimate, a diffuse signal component, or a noise estimate of the multi-channel speech pickup;
　producing, as an output of a DNN, a DNN-based speech presence probability, SPP, value for the current frame, wherein the SPP value is produced by the DNN in response to the extracted plurality of features being input to the DNN; and
　applying the DNN-based SPP value to configure a multi-channel filter whose input is the multi-channel speech pickup and whose output is the enhanced speech signal.

2. The method of claim 1 further comprising
　steering by the multi-channel filter a beamforming null in a direction of an undesired sound source.

3. The method of claim 2 further comprising
　steering by the multi-channel filter a unit gain beam or lobe in a direction of a target speech source.

4. The method of claim 1 wherein the multi-channel speech pickup comprises a plurality of acoustic microphone signals produced by a plurality of acoustic microphones, respectively, that are integrated into a housing of a loudspeaker cabinet.

5. The method of claim 1 wherein the plurality of features are extracted from windowed short time Fourier transform domain, or from Mel-frequency bins of a perceptually weighted domain, or from a gammatone filter bank of a perceptually weighted domain, of the multi-channel pickup.

6. The method of claim 1 further comprising
　performing acoustic echo cancellation upon a plurality of microphone signals, to produce i) the multi-channel speech pickup as a plurality of echo cancelled audio signals and ii) a plurality of linear echo estimates associated with the echo cancelled audio signals.

7. The method of claim 6 wherein the side information comprises the plurality of linear echo estimates, and wherein the multi-channel filter is configured to perform multi-channel residual echo suppression upon the multi-channel speech pickup.

8. The method of claim 6 further comprising
　performing dereverberation upon the plurality of echo cancelled audio signals, to produce the multi-channel speech pickup.

9. The method of claim 6 wherein the acoustic echo cancellation receives as input i) a first plurality of playback reference signals that represent inputs to a first plurality of speaker drivers in a first loudspeaker cabinet, and ii) a second plurality of playback reference signals that represent inputs to a second plurality of speaker drivers in a second loudspeaker cabinet.

10. The method of claim 1 further comprising
　applying the SPP value as a spectral mask to the output of the multi-channel filter, prior to transforming the output of the multi-channel filter into time domain.

11. The method of claim 1 further comprising
　extracting a second plurality of features from i) a new current frame of the multi-channel speech pickup and ii) second side information being a diffuse signal component of the multi-channel speech pickup or a noise estimate for the multi-channel speech pickup,
　produce, as an output of a second DNN, a second DNN-based speech presence probability value, second SPP value, for the new current frame, wherein the second SPP value is produced by the second DNN in response to the extracted second plurality of features being input to the second DNN, and
　apply the second SPP value to configure the multi-channel filter.

12. A system for producing an enhanced speech signal using a deep neural network, DNN, comprising:
　a processor; and
　memory having stored therein instructions that when executed by the processor
　　extract a first plurality of features from i) a current frame of a multi-channel speech pickup and ii) first side information selected from the group consisting of a linear echo estimate, a diffuse signal component of the multi-channel speech pickup, or a noise estimate for the multi-channel speech pickup,
　　produce, as an output of a first DNN, a first DNN-based speech presence probability value, first SPP value, for the current frame, wherein the first SPP value is produced by the first DNN in response to the extracted first plurality of features being input to the first DNN, and
　　apply the first SPP value to configure a multi-channel filter whose input is the multi-channel speech pickup and whose output is the enhanced speech signal.

13. The system of claim 12 wherein the memory has stored therein further instructions which when executed by the processor
　perform acoustic echo cancellation upon a plurality of microphone signals, to produce i) the multi-channel speech pickup as a plurality of echo cancelled audio signals and ii) a plurality of linear echo estimates associated with the echo cancelled audio signals, wherein the first side information comprises the plurality of linear echo estimates, and wherein the multi-channel filter is configured to perform multi-channel residual echo suppression upon the multi-channel speech pickup as the plurality of echo cancelled audio signals.

14. The system of claim 13 wherein the memory has stored therein further instructions which when executed by the processor extract a second plurality of features from i) a new current frame of the multi-channel speech pickup and ii) second side information being a diffuse signal component of the multi-channel speech pickup or a noise estimate for the multi-channel speech pickup, produce, as an output of a second DNN, a second DNN-based speech presence probability value, second SPP value, for the new current frame, wherein the second SPP value is produced by the second DNN in response to the extracted second plurality of features being input to the second DNN, and apply the second SPP value to configure the multi-channel filter.

15. The system of claim 14 wherein i) in response to detecting an absence of playback reference signals the second DNN is selected to produce the second SPP value which configures the multi-channel filter, or ii) in response to detecting a presence of playback reference signals the first DNN is selected to produce the first SPP value which configures the multi-channel filter.

16. The system of claim 13 further comprising a first loudspeaker cabinet housing in which the processor and the memory are integrated, wherein the multi-channel speech pickup comprises a first plurality of acoustic microphone signals produced by a plurality of acoustic microphones, respectively, that are integrated in the first loudspeaker cabinet housing.

17. The system of claim 16 wherein the acoustic echo cancellation receives as input i) a first plurality of playback reference signals that represent inputs to a first plurality of speaker drivers that are in the first loudspeaker cabinet housing, and ii) a second plurality of playback reference signals that represent inputs to a second plurality of speaker drivers that are in a second loudspeaker cabinet housing.

18. The system of claim 12 further comprising a first loudspeaker cabinet housing in which the processor and the memory are integrated, wherein the multi-channel speech pickup comprises a plurality of acoustic microphone signals produced by a first plurality of acoustic microphones, respectively, that are integrated in the first loudspeaker cabinet housing.

19. The system of claim 18 further comprising a second loudspeaker cabinet having a second plurality of acoustic microphones, an acoustic echo canceller coupled to the second plurality of acoustic microphones and configured to produce a plurality of linear echo estimates, and a wireless transmitter that is to transmit second side information from the plurality of linear echo estimates to the first loudspeaker cabinet, wherein the extracted first plurality of features being input to the first DNN also include a plurality of features extracted from the second side information.

20. A method for enhancing a speech signal, comprising:

performing acoustic echo cancellation upon a plurality of microphone signals, to produce i) a multi-channel speech pickup as a plurality of echo cancelled audio signals and ii) a plurality of linear echo estimates associated with the echo cancelled audio signals, extracting a plurality of features from i) a current frame of the multi-channel speech pickup and ii) side information selected from the plurality of linear echo estimates, a diffuse signal component, or a noise estimate of the multi-channel speech pickup;

producing speech presence probability value, SPP value, for the current frame, wherein the SPP value is produced based on the extracted plurality of features; and applying the SPP value to configure a multi-channel filter whose input is the multi-channel speech pickup and whose output is the enhanced speech signal.

21. The method of claim 20 wherein the multi-channel filter is configured to perform multi-channel residual echo suppression upon the multi-channel speech pickup.

* * * * *